United States Patent
Yu et al.

(10) Patent No.: US 7,686,633 B2
(45) Date of Patent: Mar. 30, 2010

(54) MEMORY CARD CONNECTOR WITH IMPROVED SWITCH STRUCTURE

(75) Inventors: Jian-Fei Yu, Kunshan (CN); Mao-Lin Lei, Kunshan (CN); Qi-Jun Zhao, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 425 days.

(21) Appl. No.: 11/810,248

(22) Filed: Jun. 5, 2007

(65) Prior Publication Data

US 2007/0278301 A1    Dec. 6, 2007

(30) Foreign Application Priority Data

Jun. 5, 2006    (TW)    ................... 95209721

(51) Int. Cl.
*H01R 29/00*    (2006.01)
(52) U.S. Cl. ........................................... 439/188
(58) Field of Classification Search ............... 439/630, 439/188, 159
See application file for complete search history.

(56) References Cited

U.S. PATENT DOCUMENTS

| | | | |
|---|---|---|---|
| 6,045,049 A | 4/2000 | Nishimura et al. | |
| 6,132,229 A * | 10/2000 | Wu | 439/188 |
| 6,394,827 B2 | 5/2002 | Nogami | |
| 6,816,386 B2 * | 11/2004 | Oguchi et al. | 361/769 |
| 7,004,774 B2 * | 2/2006 | Chia-Chen | 439/188 |
| 7,309,245 B2 | 12/2007 | Sadatoku et al. | 439/159 |
| 7,422,485 B2 * | 9/2008 | Yu et al. | 439/630 |
| 7,578,686 B2 * | 8/2009 | Yu et al. | 439/188 |

* cited by examiner

*Primary Examiner*—Jean Duverne
(74) *Attorney, Agent, or Firm*—Wei Te Chung; Andrew C. Cheng; Ming Chieh Chang

(57) ABSTRACT

A memory card connector (100) for insertion of a memory card (8) includes an insulative housing (1) defining a cavity (110) for receiving the memory card, a number of contacts (22), a pair of switch contacts (5) and a card eject mechanism (3). The switch contacts (5) include a first switch contact (51) and a second switch contact (52). The card eject mechanism (3) includes a slider (31) movably assembled to the insulative housing, a coiled spring (32) and a link rod (33) mating with the slider. The slider includes a protrusion (315) driven by the memory card to abut against the second switch contact (52) so that the second switch contact touches the first switch contact (51) in a vertical direction to achieve switch function.

18 Claims, 7 Drawing Sheets

MEMORY CARD CONNECTOR WITH IMPROVED SWITCH STRUCTURE

BACKGROUND OF THE INVENTION

1. Field of the Invention

This invention generally relates to a memory card connector, and more particularly to a memory card connector with switch structure.

2. Description of the Prior Art

With development of electronic devices such as cellular phones, Personal Digital Assistants (PDA) and digital cameras, memory cards are used more and more popular wherein the memory cards include a number of types including Compact Flash (CF) card, Secure Digital (SD) card, Multimedia card (MMC), Subscriber Identity Module (SIM) card, Memory Stick (MS), Smart Media (SM) card, XD-picture (XD) Card and Trans Flash (TF card). The memory cards are inserted into corresponding card connectors for signal transmission between the memory cards and the electronic devices. Generally, a card connector sets a switch structure to detect whether corresponding card is inserted into the card connector or not.

U.S. Pat. No. 6,394,827 B2 discloses a conventional memory card connector for insertion of a memory card. The memory card connector comprises an insulative housing having a pair of side walls and a card receiving cavity between said side walls, a plurality of contacts retained in the insulative housing with a plurality of contact portions protruding into the card receiving cavity, a card eject mechanism for mating with the memory card, a pair of switch contacts and a metal shield enclosing the insulative housing. The switch contacts are disposed on one of the side walls and the card eject mechanism is positioned on the other side wall. The switch contacts include a stationary contact having a contact section and a movable contact having another contact section positioned on a lateral side of the contact section. The movable contact further includes an engaging section laterally extending into the card receiving cavity for abutting against the inserted memory card. When the memory card is inserted into the card receiving cavity, the engaging section is driven by the memory card to make the another contact section of the movable contact disengages from the contact section of the stationary contact. As a result, the switch function is realized. However, some memory card connector, such as TF card connector, is becoming smaller and smaller according to the development of corresponding memory card. In this condition, the memory card connector may can't provide enough width of side walls for switch contacts mounted thereon. Besides, the movable contact of the switch contacts mounted on a lateral side of the insulative housing may suffer a serious force because the movable contact suffers a long distance engagement whether the memory card is inserted into the memory card connector or removed therefrom.

Hence, it is desired to have a memory card connector solving the problems above.

BRIEF SUMMARY OF THE INVENTION

Accordingly, an object of the present invention is to provide a memory card connector with a card eject mechanism which abuts against switch contacts to achieve detective function.

In order to attain the object above, a memory card connector for insertion of a memory card comprises an insulative housing defining a card receiving cavity, a plurality of contacts with a plurality of contact portions protruding into the card receiving cavity, a pair of switch contacts, a card eject mechanism and a metal shield enclosing the insulative housing. The switch contacts include a first switch contact and a second switch contact substantially disposed below the first switch contact. The first switch contact includes a first contact section. The second switch contact includes an engaging section extending into the card receiving cavity and a second contact section below the first contact section. The card eject mechanism comprises a slider movably assembled to the insulative housing, an elastic member with one end abutting against the insulative housing and the other end abutting against the slider, and a link rod mating with the slider. The slider comprises a body portion and a protrusion extending laterally from the body portion. The body portion defines a heart-shaped cam recessed in a top face thereof. The link rod comprises a first hook retained in the insulative housing and a second hook movable in the heart-shaped cam. The protrusion includes an actuation portion mating with the inserted memory card and an extending portion perpendicular to the actuation portion for abutting against the second switch contact. When the memory card is inserted into the card receiving cavity, the extending portion abuts against the engaging section of the second contact by means of the actuation portion driven by the memory card. As a result, the second contact section touches the first contact section in a vertical direction to achieve switch function. The first and second switch contacts mate with each other in the vertical direction by means of the slider abutting against the second switch contacts. In this condition, the second switch contact can suffer a balanced force to prevent it from excessive deformation after long time usage.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Reference will now be made in detail to the preferred embodiment of the present invention.

Figure 1:
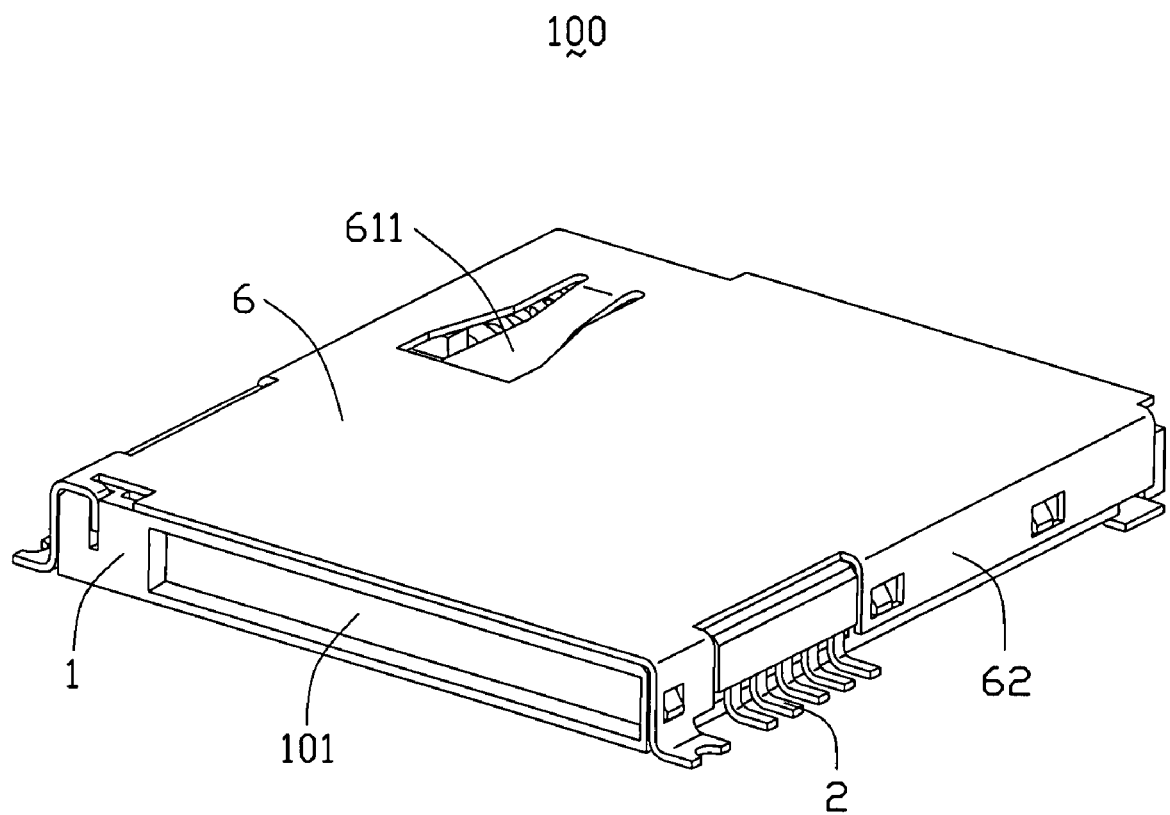
FIG. 1 is a front, perspective view of a memory card connector according to a preferred embodiment of the present invention.
Figure 2:
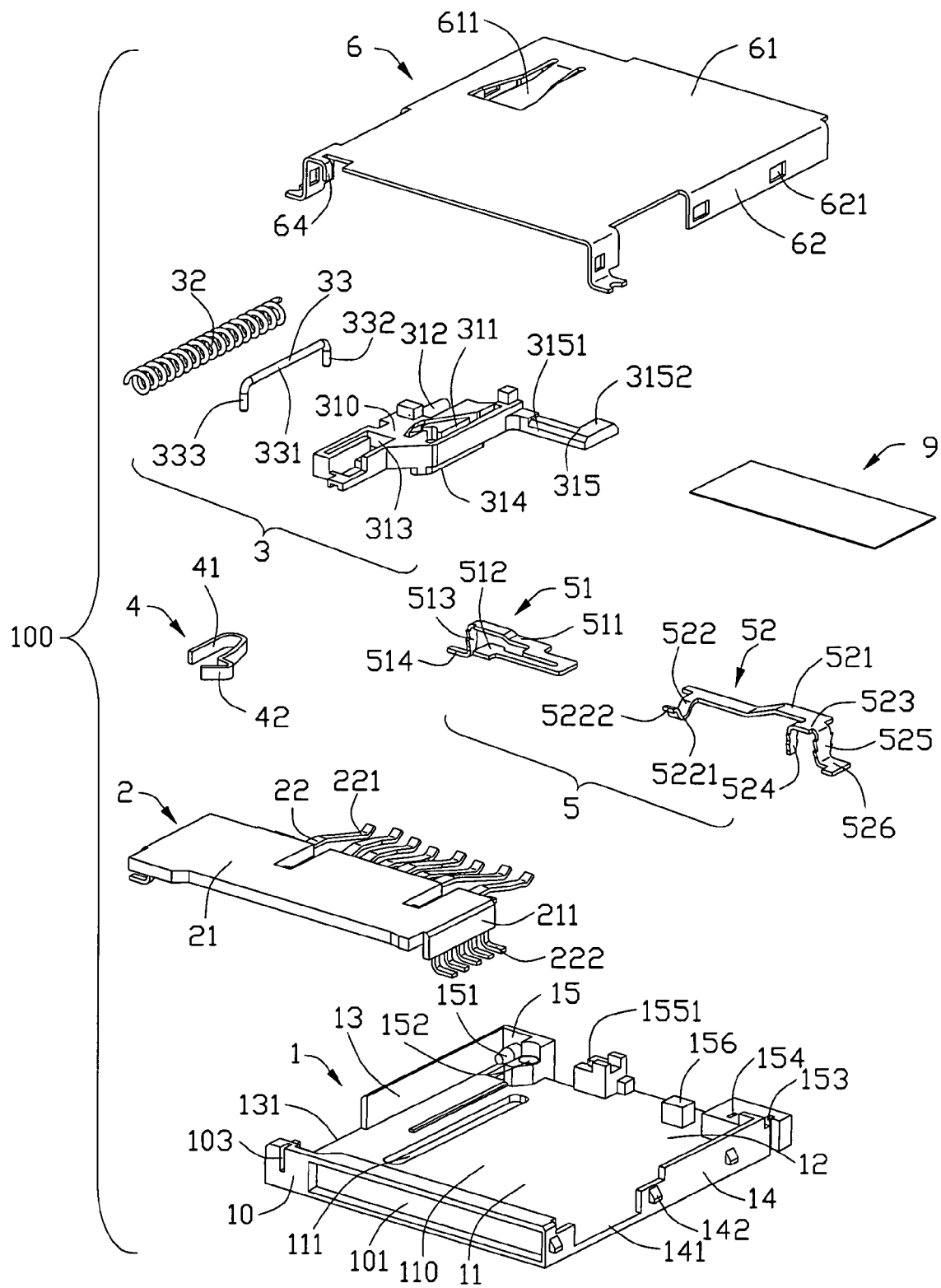
FIG. 2 is an exploded view of the memory card connector shown in FIG. 1.
Figure 3:
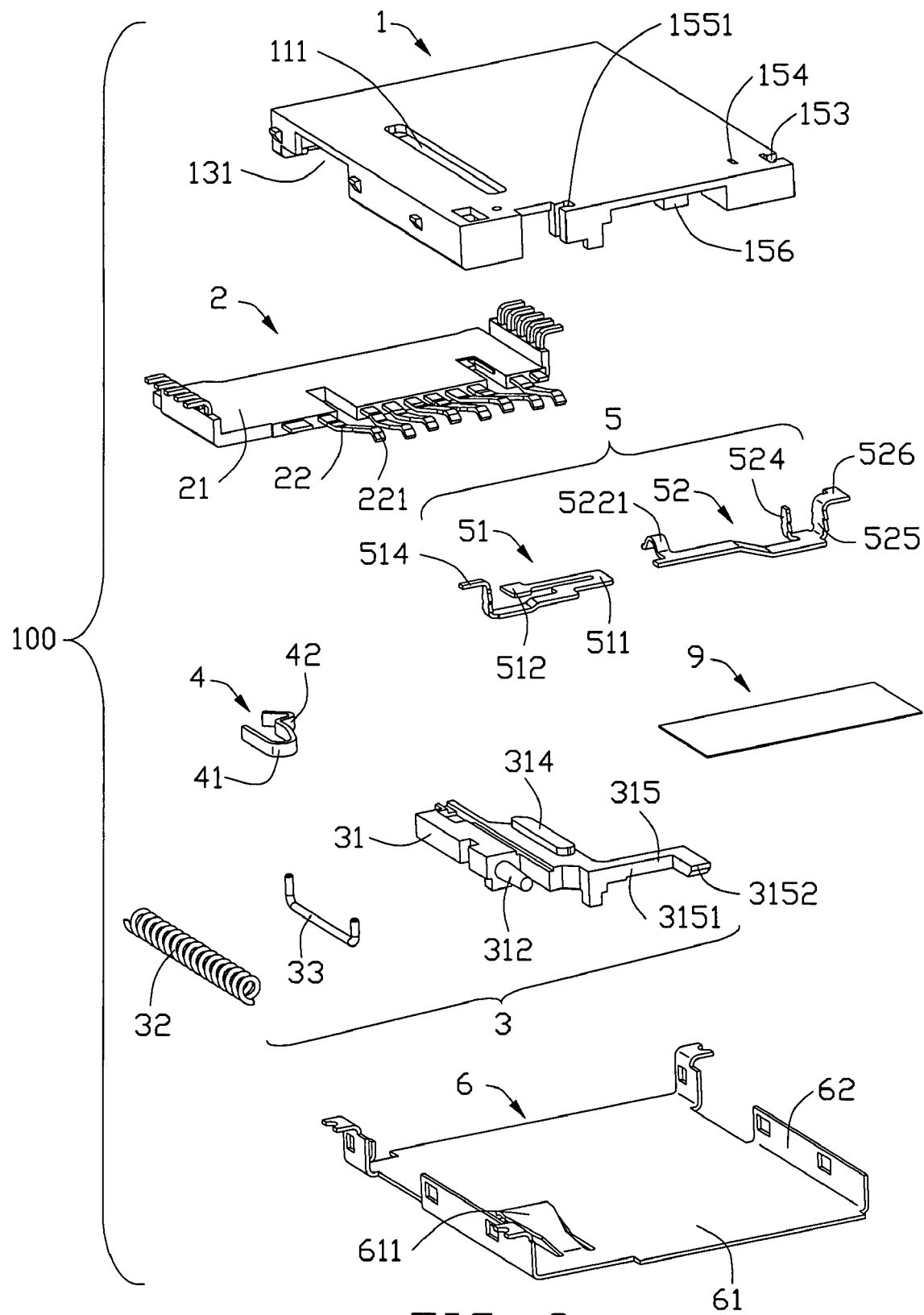
FIG. 3 is similar to FIG. 2, but viewed from another aspect.

Referring to FIGS. 1 to 3, a memory card connector 100 mounted on a PCB 7 (shown in FIG. 6) for receiving a memory card 8 comprises an insulative housing 1, a contact module 2, a card eject mechanism 3, a card lock member 4, a pair of switch contacts 5 retained in the insulative housing 1, a piece of insulative film 9 covering the switch contacts (shown in FIG. 7) and a metal shield 6 enclosing the insulative housing 1.

The insulative housing 1 includes a base portion 11 and a frame shaped mating portion 10 at the front of the base portion 11. The base portion 11 defines a cavity 110 having an opening 101 which extends through the mating portion 10 and permits insertion and removal of the memory card 8 into and out of the cavity 110. The mating portion 10 includes a narrow slot 103 positioned on a lateral side of the opening 101 for retaining the metal shield 6. The base portion 11 includes a top wall 12, opposite first and second side walls 13, 14 and a discontinuous rear wall 15 opposite to the mating portion 10. The top wall 12 defines a front-to-back guiding slot 111 for guiding movement of the card eject mechanism 3. The first and second side walls 13, 14 define opposite first and second cutouts 131, 141, respectively, for mating with the contact module 2. The rear wall 15 defines a first mounting slit 1551 and a pair of second mounting slits 153, 154 for holding the switch contacts 5.

The contact module 2 comprises a plurality of contacts 22 and a beam 21 over-molding the contacts 22. The beam 21 includes a pair of side portions 211 received in the first and second cutouts 131, 141, respectively. The contacts 22 include a plurality of contact portions 221 extending into the cavity 110 for electrically mating with the memory card 8 and a plurality of soldering portions 222 extending sidewardly beyond the side portions 211 to be soldered to the PCB 7.

The card eject mechanism 3 comprises a slider 31, an elastic member which is a coiled spring 32 in the preferred embodiment and a link rod 33. The slider 31 includes a body portion 310 and an L-shaped protrusion 315 extending laterally from a front side of the body portion 310. The body portion 310 includes a heart-shaped cam 311 recessed in a top face thereof and a projecting 314 extending downwardly from a bottom face of the body portion 310. The L-shaped protrusion 315 includes an actuation portion 3151 for abutting against the memory card 8 and an extending portion 3152 perpendicular to the actuation portion 3151 for mating with the switch contacts 5. The projecting 314 is movably received in the guiding slot 111 to make sure that the slider 31 moves along the front-to-back direction. Besides, a U-shaped recess 313 is defined in the body portion 310 of the slider 31 to retain the card lock member 4.

The coiled spring 32 gives the slider 31 elastic force to realize ejecting the memory card 8 from the memory card connector 100. In order to fix the coiled spring 32 in the memory card connector 100, the rear wall 15 of the insulative housing 1 and the slider 31 include first and second fixing posts 151, 312, respectively. The coiled spring 32 is assembled between the first and second fixing posts 151, 312.

The link rod 33 includes a middle portion 331, a first hook 332 and a second hook 333 downwardly bending from opposite ends of the middle portion 331. The first hook 332 is inserted into a mounting hole 152 of the insulative housing 1 for retaining purpose. The second hook 333 can move in the heart-shaped cam 311. The working theory of the card eject mechanism 3 is obvious to the people in the art, so the detailed description is omitted hereinafter.

The card lock member 4 is received in the U-shaped recess 313 of the slider 31 and comprises a stationary portion 41 and a locking portion 42 at a distal end of the stationary portion 41. The locking portion 42 protrudes into the cavity 110 for holding the memory card 8 when it is inserted into the memory card connector 100.

Figure 4:
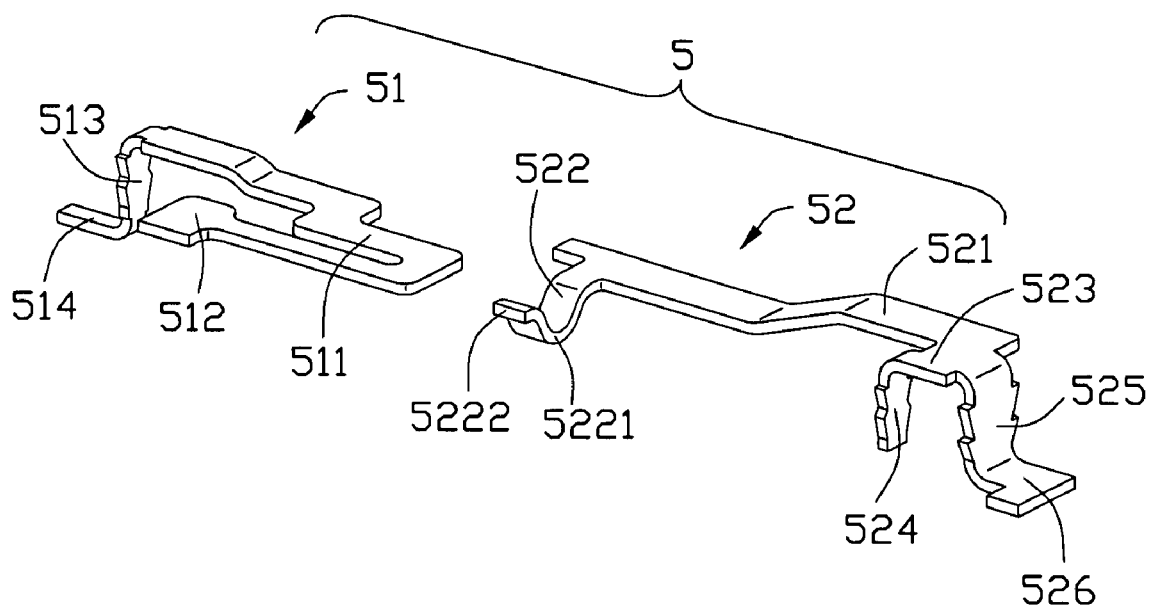
FIG. 4 is an enlarged, perspective view of a pair of switch contacts.
Figure 5:
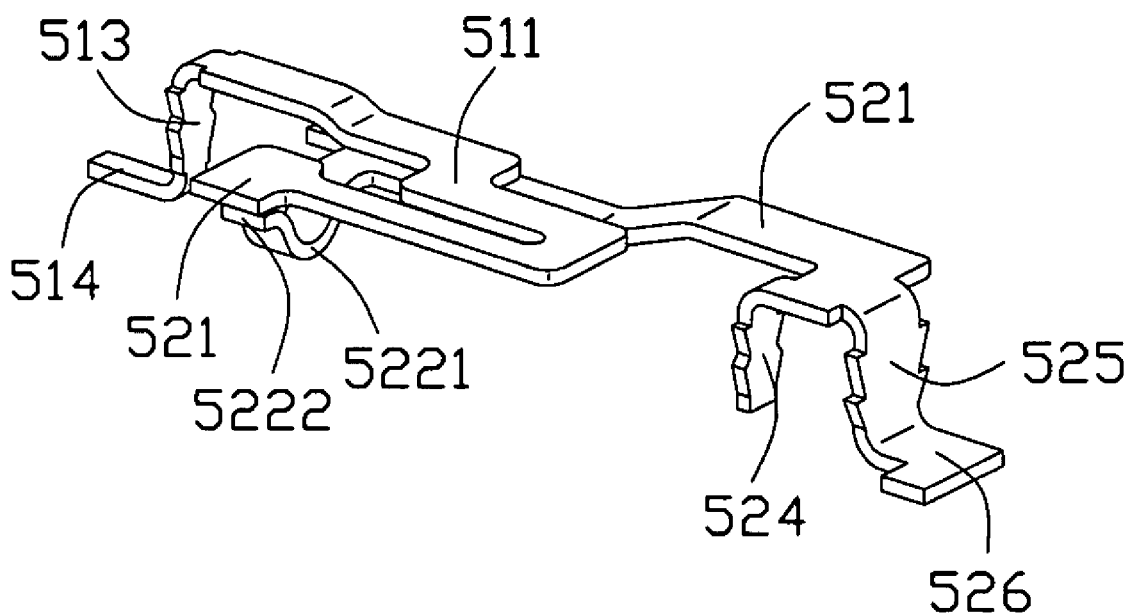
FIG. 5 is a perspective view of the pair of switch contacts when the switch contacts are assembled to an insulative housing of the memory card connector.

Referring to FIGS. 4 and 5, the pair of switch contacts 5 include a first switch contact 51 and a second switch contact 52 disposed below the first switch contact 51. The first switch contact 51 includes a U-shaped base 511, an enlarged first contact section 512 at a distal end of the base 511, a first retaining section 513 bending downwardly from the base 511 and a first soldering tail 514 perpendicular to the first retaining section 513. The first retaining section 513 is received in the first mounting slit 1551 so that the first switch contact 51 can be fixed in the insulative housing 1. The second switch contact 52 includes a second base 521, a spring arm 522 cantilevered extending forwardly from one side of the second base 521 and a protrusion 523 extending forwardly from the other side of the second base 521. The rear wall 15 further includes a block 156 for supporting the second base 521. The spring arm 522 includes an engaging section 5221 extending downwardly for abutting against the inserted memory card 8, and a second contact section 5222 detachably engaging with the first contact section 512. The protrusion 523 includes a pair of second retaining sections 524, 525 received in the corresponding second mounting slits 153, 154 of the insulative housing 1, and a second soldering tail 526 perpendicular to the second retaining section 525. Both of the first and second soldering tails 514, 526 extend beyond the insulative housing 1 to be soldered to the PCB 7.

Referring to FIGS. 2 and 3, the metal shield 6 includes a top wall 61 and a pair of side walls 62 bending from lateral edges of the top wall 61. The top wall 61 includes a tab 64 formed at the front edge thereof to be received in the corresponding narrow slot 103 of the mating portion 10 of the insulative housing 1. The top wall 61 includes an inward cantilever 611 for pressing the middle portion 331 of the link rod 33 to prevent it from falling out. Besides, the side walls 62 define a plurality of holes 621 and the first and second side walls 13, 14 of the insulative housing include a plurality of corresponding protrusions 132, 142 received in the holes 621 so that the metal shield 6 can be stably attached to the insulative housing 1.

Figure 6:
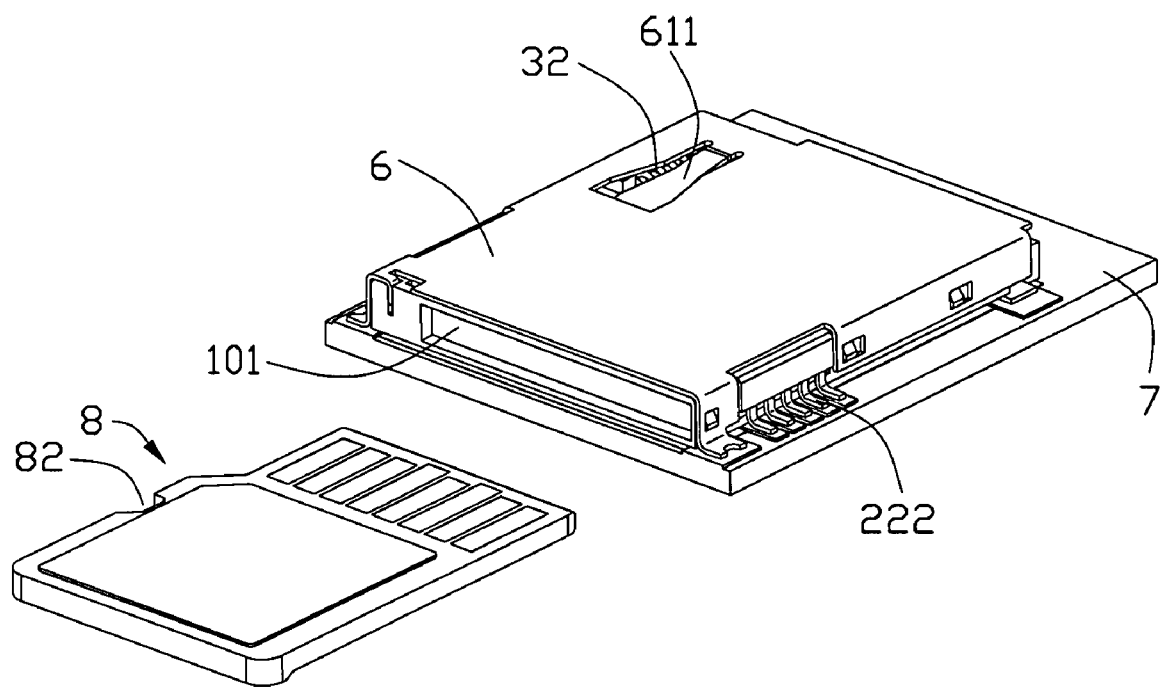
FIG. 6 is a perspective view of the memory card connector mounted on a printed circuit board (PCB) showing a memory card detached from the memory card connector.
Figure 7:
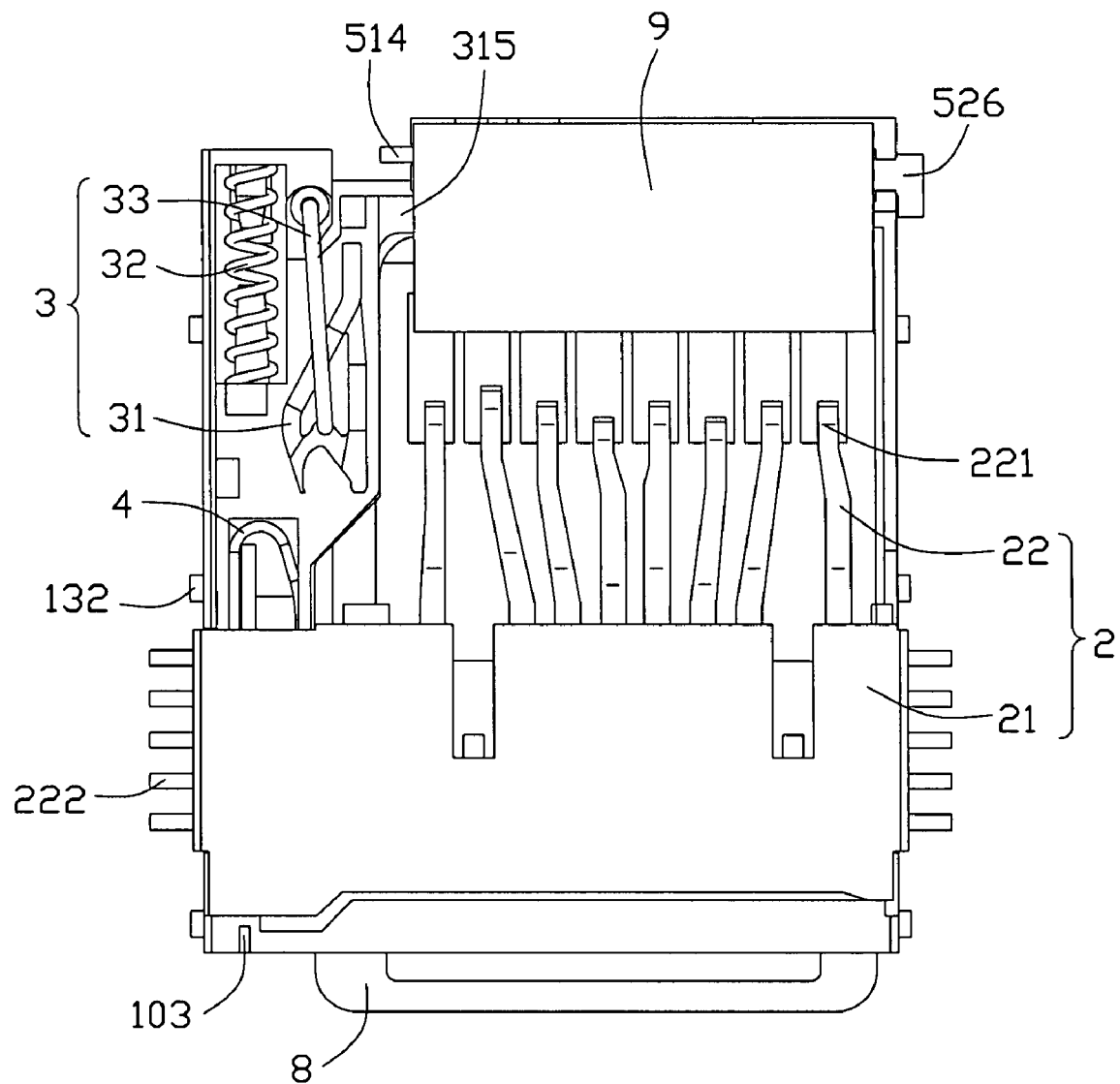
FIG. 7 is a top view of the memory card connector showing the memory card inserted into the memory card connector and with a metal shield removed.

Referring to FIGS. 6 and 7, in use, when the memory card 8 is inserted into the cavity 110 through the opening 101, the actuation portion 3151 is driven by the front edge of the memory card 8. The extending portion 3152 is simultaneously driven to abut against the engaging section 5221 of the second contact 52 to make the second contact section 5222 touch the first contact section 512 in a vertical direction. The first and second switch contacts 51, 52 mate with each other in the vertical direction by means of slider 31 abutting against the second switch contacts 52. In this condition, the second switch contact 52 can suffer a balanced force to prevent it from excessive deformation after long time usage. In the process, the second hook 333 of the link rod 33 moves in the heart-shaped cam 311 of the slider 31 and the coiled spring 32 is compressed. When the memory card 8 is fully inserted into the memory card connector 100, the second hook 333 reaches a locking position of the heart-shaped cam 311. The locking portion 42 of the card lock member 4 mates with a notch 82 of the memory card 8. As a result, the memory card can be stably retained in the memory card connector 100. When further exerting a forward force on the fully inserted memory card 8, the memory card 8 and the slider 31 move rearwards. The slider 31 returns to its initiative position via the elastic force recovery of the coiled spring 32. At the same time, the second hook 333 moves from the locking position and the locking portion 42 of the card lock member 4 disengages with the notch 82 of the memory card 8, thereby the memory card 8 is ejected from the memory card connector 100. As a result, the first and second switch contacts 51, 52 disengage with each other.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A memory card connector for insertion of a memory card, comprising:
    an insulative housing defining a card receiving cavity;
    a plurality of contacts with a plurality of contact portions protruding into the card receiving cavity;
    a pair of switch contacts comprising a first switch contact and a second switch contact, the first switch contact comprising a first contact section, the second switch contact comprising an engaging section and a second contact section below the first contact section; and
    a card eject mechanism assembled to the insulative housing, the card eject mechanism comprising:
        a slider movably assembled to the insulative housing, the slider comprising a body portion and a protrusion extending from the body portion, the protrusion being driven by the memory card to abut against the engaging section of the second switch contact so that the second contact section touches the first contact section in a vertical direction;
        an elastic member mating with the slider; and
        a link rod mating with the slider.

2. The memory card connector according to claim 1, wherein the protrusion of the slider extends laterally from a front side of the body portion.

3. The memory card connector according to claim 1, wherein the protrusion of the slider comprises an actuation portion abutting against the memory card and an extending portion abutting against the engaging section of the second switch contact.

4. The memory card connector according to claim 3, wherein the extending portion is perpendicular to the actuation portion.

5. The memory card connector according to claim 1, wherein the first switch contact comprises a first base, the first contact section being disposed at a distal end of the first base.

6. The memory card connector according to claim 1, wherein the second switch contact comprises a second base and a spring arm cantilevered extending from one side of the second base, the engaging section and the second contact section being positioned on the spring arm.

7. The memory card connector according to claim 6, wherein the second contact section is disposed at the distal end of the engaging section.

8. The memory card connector according to claim 6, wherein the insulative housing comprises a block to support the second base.

9. The memory card connector according to claim 6, wherein the second switch contact comprises a second retaining section extending from the other side of the second base.

10. The memory card connector according to claim 1, further comprising a beam over-molding the plurality of contacts, the beam being retained to the insulative housing.

11. The memory card connector according to claim 10, wherein the beam comprises a pair of side portions, the insulative housing comprising a pair of side walls defining a pair of cutouts to receive the side portions.

12. The memory card connector according to claim 11, wherein the contacts comprise a plurality of soldering portions extending sidewardly beyond the side portions.

13. The memory card connector according to claim 1, wherein the insulative housing comprises a base portion and a frame shaped mating portion at a front of the base portion, the card receiving cavity being defined in the base portion and having an opening which extends through the mating portion.

14. The memory card connector according to claim 1, wherein the elastic member is a coiled spring which comprises one end abutting against the slider and the other end abutting against the insulative housing.

15. The memory card connector according to claim 1, wherein the body portion comprises a heart-shaped cam recessed in a top face thereof.

16. The memory card connector according to claim 15, wherein the link rod comprises one hook retained in the insulative housing and the other hook movable in the heart-shaped cam.

17. A memory card connector for insertion of a memory card, comprising:
    an insulative housing defining a card receiving cavity;
    a plurality of contacts with a plurality of contact portions protruding into the card receiving cavity;
    a pair of switch contacts comprising a first switch contact and a second switch contact; and
    a card eject mechanism assembled to the insulative housing, the card eject mechanism comprising:
        a slider movably assembled to the insulative housing, the slider comprising a body portion and a protrusion extending from the body portion, the protrusion being driven by the memory card to abut against the second switch contact so that the second switch contact touches the first switch contact in a vertical direction.

18. The memory card connector as claimed in claim 17, wherein the first switch contact and the second switch contact have respective solder tails spaced far away each other and respective contacting sections extending toward each other under a condition that one of said contacting sections defines a U-shape and contact points of both said contacting sections being located at respective distal ends so as to have the contact position of said first and second switch contacts is much closer to one solder tail than to the other.

* * * * *